United States Patent
Hirata et al.

(10) Patent No.: US 8,578,703 B2
(45) Date of Patent: Nov. 12, 2013

(54) EXHAUST EMISSION PURIFYING APPARATUS FOR INTERNAL COMBUSTION ENGINE

(75) Inventors: Kiminobu Hirata, Ageo (JP); Nobuhiko Masaki, Ageo (JP); Hisashi Akagawa, Ageo (JP); Yuji Yajima, Ageo (JP)

(73) Assignee: Nissan Diesel Motor Co., Ltd., Saitama-Ken (JP)

( * ) Notice: Subject to any disclaimer, the term of this patent is extended or adjusted under 35 U.S.C. 154(b) by 242 days.

(21) Appl. No.: 12/954,337

(22) Filed: Nov. 24, 2010

(65) Prior Publication Data

US 2011/0067384 A1    Mar. 24, 2011

Related U.S. Application Data

(60) Division of application No. 11/495,636, filed on Jul. 31, 2006, now Pat. No. 8,011,176, which is a continuation of application No. PCT/JP2005/001529, filed on Feb. 2, 2005.

(30) Foreign Application Priority Data

Feb. 2, 2004 (JP) ................................ 2004-025754
Feb. 2, 2004 (JP) ................................ 2004-025755
Mar. 29, 2004 (JP) ................................ 2004-095291

(51) Int. Cl.
*F01N 3/00* (2006.01)
(52) U.S. Cl.
USPC ............... 60/286; 60/274; 60/295; 60/300; 60/301; 60/303

(58) Field of Classification Search
USPC .................... 60/286, 295, 301, 303
See application file for complete search history.

(56) References Cited

U.S. PATENT DOCUMENTS

| | | |
|---|---|---|
| 3,556,734 A | 1/1971 | Peterson |
| 4,393,980 A | 7/1983 | Armour et al. |
| 4,962,789 A | 10/1990 | Benscoter |
| 5,116,579 A | 5/1992 | Kobayashi et al. |
| 5,140,814 A | 8/1992 | Kreutmair et al. |
| 5,176,325 A | 1/1993 | Vidusek |

(Continued)

FOREIGN PATENT DOCUMENTS

| | | |
|---|---|---|
| DE | 41 09 305 | 9/1992 |
| DE | 19855338 | 6/2000 |

(Continued)

OTHER PUBLICATIONS

European Patent Office Communication dated Oct. 24, 2011 in corresponding European Patent Application No. 05709649.7.

*Primary Examiner* — Thomas Denion
*Assistant Examiner* — Diem Tran
(74) *Attorney, Agent, or Firm* — McDermott Will & Emery LLP

(57) ABSTRACT

In an exhaust emission purifying apparatus for an internal combustion engine, for adding a reducing agent for $NO_x$ to the exhaust gas to thereby purify $NO_x$ in the exhaust gas, the mixing of the reducing agent injected by an injection nozzle with the exhaust gas is accelerated. To this end, in the apparatus of the present invention, the injection nozzle for the urea water is disposed to be opposite to the flow of the exhaust gas, or to face upward in a vertical direction.

3 Claims, 9 Drawing Sheets

(56) References Cited

U.S. PATENT DOCUMENTS

| | | |
|---|---|---|
| 5,372,312 A | 12/1994 | Vidusek |
| 5,406,790 A | 4/1995 | Hirota et al. |
| 5,431,893 A | 7/1995 | Hug et al. |
| 5,435,976 A | 7/1995 | Berner et al. |
| 5,553,783 A | 9/1996 | Slavas et al. |
| 5,601,792 A | 2/1997 | Hug et al. |
| 5,603,453 A | 2/1997 | Weaver et al. |
| 5,605,042 A | 2/1997 | Stutzenberger |
| 5,606,856 A | 3/1997 | Linder et al. |
| 5,778,922 A | 7/1998 | Schoultz |
| 5,832,720 A | 11/1998 | Svahn |
| 5,853,025 A | 12/1998 | Daneshvar |
| 5,884,475 A | 3/1999 | Hofmann et al. |
| 5,974,789 A | 11/1999 | Mathes et al. |
| 5,992,141 A | 11/1999 | Berriman et al. |
| 6,023,930 A | 2/2000 | Abe et al. |
| 6,041,594 A | 3/2000 | Brenner et al. |
| 6,050,088 A | 4/2000 | Brenner |
| 6,098,896 A | 8/2000 | Haruch |
| 6,167,698 B1 | 1/2001 | King et al. |
| 6,260,353 B1 | 7/2001 | Takahashi |
| 6,279,603 B1 | 8/2001 | Czarnik et al. |
| 6,293,097 B1 | 9/2001 | Wu et al. |
| 6,382,600 B1 | 5/2002 | Mahr |
| 6,387,336 B2 | 5/2002 | Marko et al. |
| 6,399,034 B1 | 6/2002 | Weisweiler |
| 6,408,619 B1 | 6/2002 | Wissler et al. |
| 6,422,262 B1 | 7/2002 | Takeuchi et al. |
| 6,513,323 B1 | 2/2003 | Weigl et al. |
| 6,755,017 B2 | 6/2004 | Katashiba et al. |
| 6,814,303 B2 | 11/2004 | Edgar et al. |
| 6,895,747 B2 | 5/2005 | Upadhyay et al. |
| 6,912,846 B2 | 7/2005 | Huber et al. |
| 7,062,903 B2 * | 6/2006 | Brenner et al. .................. 60/286 |
| 7,063,642 B1 | 6/2006 | Hu et al. |
| 2002/0023433 A1 | 2/2002 | Goerigk et al. |
| 2002/0134074 A1 | 9/2002 | Huthwohl et al. |
| 2002/0162322 A1 | 11/2002 | Ganzmann et al. |
| 2003/0213234 A1 | 11/2003 | Funk et al. |
| 2004/0045284 A1 | 3/2004 | Ripper et al. |
| 2006/0260297 A1 | 11/2006 | Koch |
| 2007/0101700 A1 | 5/2007 | Masaki et al. |
| 2007/0193255 A1 | 8/2007 | Satou |
| 2008/0148717 A1 | 6/2008 | Ohshima et al. |
| 2008/0302088 A1 | 12/2008 | Koehler et al. |

FOREIGN PATENT DOCUMENTS

| | | |
|---|---|---|
| DE | 19946901 | 4/2001 |
| DE | 10060808 | 7/2002 |
| EP | 0886043 | 12/1998 |
| JP | 56155618 | 12/1981 |
| JP | 64000311 | 1/1989 |
| JP | 02-173311 | 7/1990 |
| JP | 02-218418 | 8/1990 |
| JP | 02-223624 | 9/1990 |
| JP | 02-223625 | 9/1990 |
| JP | 03-242415 | 10/1991 |
| JP | 3-129712 | 12/1991 |
| JP | 04-237860 | 8/1992 |
| JP | 04-292565 | 10/1992 |
| JP | 05-171921 | 7/1993 |
| JP | 05-222923 | 8/1993 |
| JP | 05-302509 | 11/1993 |
| JP | 06-007643 | 1/1994 |
| JP | 07-127503 | 5/1995 |
| JP | 07-279650 | 10/1995 |
| JP | 8-193511 | 7/1996 |
| JP | 8-210124 | 8/1996 |
| JP | 9-509890 | 10/1997 |
| JP | 9-511807 | 11/1997 |
| JP | 10-121949 | 5/1998 |
| JP | 11-294145 | 10/1999 |
| JP | 2000-027627 | 1/2000 |
| JP | 2000145434 | 5/2000 |
| JP | 2000-257419 | 9/2000 |
| JP | 2000-314308 | 11/2000 |
| JP | 2001-020724 | 1/2001 |
| JP | 2001-027112 | 1/2001 |
| JP | 2001-050035 | 2/2001 |
| JP | 2001-173431 | 6/2001 |
| JP | 2001-523165 | 11/2001 |
| JP | 2002-004840 | 1/2002 |
| JP | 2002-030927 | 1/2002 |
| JP | 2002-097940 | 4/2002 |
| JP | 2002-155732 | 5/2002 |
| JP | 2002-513109 | 5/2002 |
| JP | 2002-188431 | 7/2002 |
| JP | 2002-221024 | 8/2002 |
| JP | 2002-531743 | 9/2002 |
| JP | 2002-332825 | 11/2002 |
| JP | 2003-010644 | 1/2003 |
| JP | 2003-239727 | 8/2003 |
| JP | 2003-260332 | 9/2003 |
| JP | 2003-328734 | 11/2003 |
| JP | 2004-044405 | 2/2004 |
| JP | 2002-097940 | 4/2004 |
| JP | 2004-044405 | 12/2004 |
| WO | WO 96/08639 | 3/1996 |
| WO | WO 99/30811 | 6/1999 |
| WO | WO 99-55445 | 11/1999 |
| WO | WO 03/018177 | 3/2003 |

* cited by examiner (a)

(b)

EXHAUST EMISSION PURIFYING APPARATUS FOR INTERNAL COMBUSTION ENGINE

CROSS-REFERENCE TO RELATED APPLICATIONS

This application is a divisional of U.S. patent application Ser. No. 11/495,636, filed on Jul. 31, 2006, which is a continuation of PCT/JP2005/001529, filed on Feb. 2, 2005, all of which are hereby incorporated by reference in their entirety for all purposes.

BACKGROUND OF THE INVENTION

1. Field of the Invention

The present invention relates to an exhaust emission purifying apparatus for an internal combustion engine, and in particular, to an exhaust emission purifying apparatus adopted for use in purifying nitrogen oxides ($NO_x$) in the exhaust gas from an internal combustion engine by adding a reducing agent for the $NO_x$ to the exhaust gas through an injection nozzle disposed in an exhaust passage.

2. Description of the Related Art

There has been known the following apparatus as an apparatus for purifying nitrogen oxides, or $NO_x$, contained in the exhaust gas of an on-vehicle engine such as a diesel engine. Namely, in this apparatus, a reduction catalyst is disposed in an exhaust passage of the engine, and also, an injection nozzle for a reducing agent is disposed on the upstream of this reduction catalyst in the exhaust passage. In such an apparatus, the reducing agent is added to the exhaust gas by means of the injection nozzle, and $NO_x$ in the exhaust gas and the added reducing agent are reacted with each other on the reduction catalyst, so that $NO_x$ can be purified. As the reducing agent, other than the ammonia water, the urea water and another liquid reducing agent are used. The reducing agent is stored in a storage tank in a liquid state, and a necessary amount of reducing agent is injected by the injection nozzle. An injection amount of the injection nozzle is controlled according to engine operating conditions, so that the reducing agent can be added in just proportion, and $NO_x$ can be efficiently purified (refer to Japanese Unexamined Patent Publication No. 2000-027627).

However, the above described exhaust emission purifying apparatus for an engine has the following problems.

Firstly, in this exhaust emission purifying apparatus, the injection nozzle is fixed to a pipe wall upper portion of the exhaust passage, and also, a nozzle hole thereof is set to open toward a forward direction to the flow of the exhaust gas, and also to direct downward in a vertical direction. Therefore, the injected reducing agent is carried on the flow of the exhaust gas, and is difficult to sufficiently mix with the exhaust gas, and thus the reaction on the reduction catalyst does not proceed sufficiently so that the desired exhaust emission purifying performance cannot be achieved. Further, since the nozzle hole is set to direct downward, the injected reducing agent is readily to be attached to a pipe wall bottom face of the exhaust passage, and a reducing agent amount which reaches the reduction catalyst tends to be short. To increase an injection pressure of the reducing agent in order to accelerate the mixing of the reducing agent with the exhaust gas is not necessarily preferable, since there are problems in the excessive adding of the reducing agent and the running cost of the apparatus. In the case where the reducing agent is excessively added due to the increase of the injection pressure, such a problem occurs that all of the added reducing agent might not be consumed in the reaction with $NO_x$, and a partial reducing agent passes through the reduction catalyst to be discharged into the atmosphere.

Secondly, in this exhaust emission purifying apparatus, since the injection nozzle is disposed in a manner hanging from the pipe wall upper portion of the exhaust passage, the reducing agent is susceptible to the dripping after the injection. If the deposition of the reducing agent occurs in the nozzle hole and at the periphery thereof due to this dripping, an amount of the reducing agent to be added lacks due to the clogging, resulting in the degradation of the exhaust emission purifying performance.

Thirdly, in this exhaust emission purifying apparatus, in order to start an engine operation under such a low temperature environment where the reducing agent is frozen, a heater is disposed to a storage tank so that the frozen reducing agent is defrosted by this heater. However, since this storage tank has a relatively large volume, a considerable amount of time is needed until the reducing agent is defrosted to enable the injection. Therefore, the sufficient exhaust emission purifying performance cannot be achieved immediately after the engine operation is started.

SUMMARY OF THE INVENTION

The present invention has an object to accelerate the mixing of the reducing agent with the exhaust gas to satisfactorily proceed with the reaction on the reduction catalyst, and to reliably achieve the desired exhaust emission purifying performance.

Further, the present invention has an object to prevent the dripping after the injection, and to avoid the degradation of the exhaust emission purifying performance due to occurrence of deposition of the reducing agent.

Furthermore, the present invention has an object to promptly defrost a partial reducing agent to be in a usable state, to thereby achieve the sufficient exhaust emission purifying performance immediately after the engine operation is started under a low temperature environment.

In order to achieve the above objects, the present invention provides an exhaust emission purifying apparatus for an internal combustion engine.

The apparatus according to one aspect of the present invention comprises: a reduction catalyst disposed in an exhaust passage of the internal combustion engine, for accelerating the reductive purification of nitrogen oxides (to be referred to as $NO_x$ hereunder); and an injection nozzle disposed on the upstream of the reduction catalyst in the exhaust passage, for adding a reducing agent for $NO_x$ to the exhaust gas, in which the reducing agent is injected by the injection nozzle toward the upstream relative to the flow of the exhaust gas.

The apparatus according to another aspect of the present invention comprises: a reduction catalyst disposed in an exhaust passage of the internal combustion engine, for accelerating the reductive purification of $NO_x$; and an injection nozzle disposed on the upstream of the reduction catalyst in the exhaust passage, for adding a reducing agent for $NO_x$ to the exhaust gas, in which the reducing agent is injected upward in a vertical direction by the injection nozzle.

The apparatus according to a further aspect of the present invention comprises: a reduction catalyst disposed in an exhaust passage of the internal combustion engine, for accelerating the reductive purification of $NO_x$; an injection nozzle disposed on the upstream of the reduction catalyst in the exhaust passage, for adding a reducing agent for $NO_x$ to the exhaust gas; and a storage tank for storing therein the reducing agent in a liquid state; and a heater for heating the reducing agent in the storage tank, in which as the storage tank, there are disposed a first tank having a relatively large volume, and a second tank which is arranged between the first tank and the injection nozzle, and has a volume smaller than that of the first tank, and as the heater, there are disposed a first heater for heating the reducing agent in the first tank, and a second heater for heating the reducing agent in the second tank.

According to the present invention, since the reducing agent is injected by the injection nozzle toward the upstream relative to the flow of the exhaust gas, it is possible to diffuse the reducing agent utilizing the flow of the exhaust gas, to thereby positively sufficiently mix the reducing agent with the exhaust gas.

Further, since the reducing agent is injected upward in the vertical direction by the injection nozzle, it is possible to acquire an increased distance of suspension (and an increased duration of suspension) until the injected reducing agent is attached to the pipe wall bottom face of the exhaust passage, to thereby proceed with the mixing of the reducing agent with the exhaust gas. Furthermore, it is possible to lessen the chance of dripping of the reducing agent after the injection, to thereby prevent the deposition of the reducing agent.

Moreover, as the storage tank, in addition to the first tank having the relatively large volume, the second tank having the volume smaller than that of the first tank is disposed, and the heaters are disposed to both of the first and second tanks. Therefore, when the engine operation is started under a low temperature environment, it is possible to promptly defrost the reducing agent in the second tank having the smaller volume to thereby adopt the defrosted reducing agent for the $NO_x$ purification immediately after the engine operation is started.

The other objects, features and advantages of the present invention will become apparent from the ensuing description of the embodiments with reference to the accompanying drawings.

The entire contents of Japanese Patent Application Nos. 2004-025754, 2004-025755 and 2004-095291, priorities of which are claimed, are incorporated herein by reference as a part of the present invention.

DESCRIPTION OF THE PREFERRED EMBODIMENTS

The present invention will be described referring to the accompanying drawings hereunder.

Figure 1:
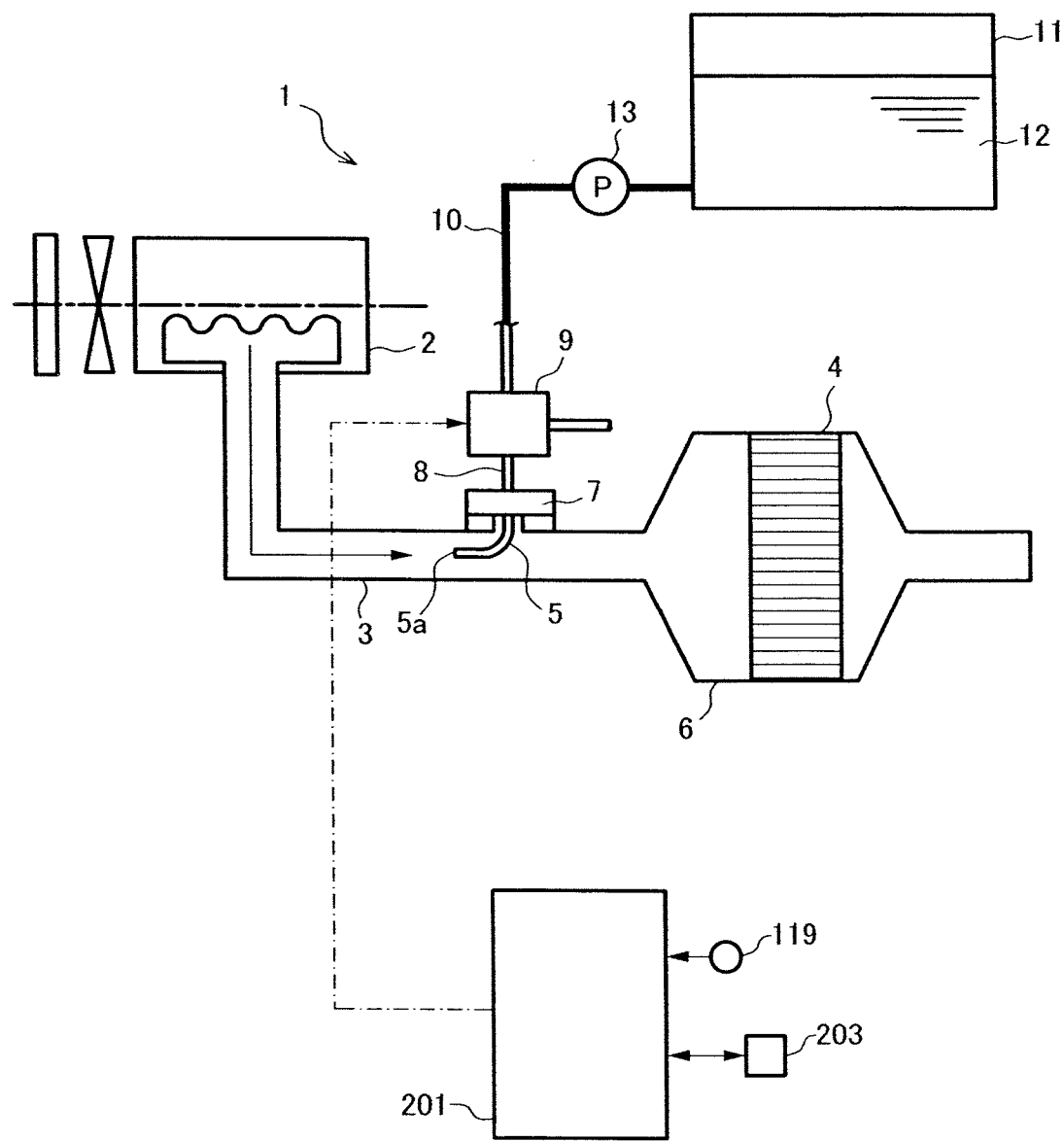
FIG. 1 is a diagrammatic view showing a configuration of an exhaust emission purifying apparatus according to a first embodiment of the present invention.

FIG. 1 shows a configuration of an internal combustion engine 1 (to be referred simply to as "engine" hereunder) which comprises an exhaust emission purifying apparatus according to a first embodiment of the present invention. The engine 1 includes an exhaust passage 3 (which comprises an exhaust manifold and an exhaust pipe on the downstream thereof) connected to an engine body 2; a reduction catalyst 4 disposed in the exhaust passage 3; and an injection nozzle 5 disposed on the upstream of the reduction catalyst 4 in the exhaust passage 3. The exhaust emission purifying apparatus according to the present embodiment is for adding a reducing agent to the exhaust gas of the engine 1 by means of the injection nozzle, to purify $NO_x$ in the exhaust gas, and comprises a storage tank 11 to be described later and a SCR (Selective Catalytic Reduction) control unit 201, in addition to the reduction catalyst 4 and the injection nozzle 5. Incidentally, in this embodiment, the urea aqueous solution being ammonia precursor is adopted as the reducing agent for $NO_x$. The urea water is added to the exhaust gas to hydrolytically react due to the exhaust heat, thereby generating ammonia.

The reduction catalyst 4 is disposed in the exhaust passage 3 while being accommodated in a housing 6. The housing 6 is connected to an exhaust pipe at upstream and downstream sides thereof. It is preferable that, other than the reduction catalyst 4, an oxidation catalyst and an ammonia purification catalyst (which are not shown in the figure) are disposed in the exhaust passage 3. The oxidation catalyst is for oxidizing hydrocarbon and carbon monoxide in the exhaust gas and also for transforming nitrogen monoxide (to be referred to as NO hereunder) in the exhaust gas into $NO_x$ mainly containing nitrogen dioxide (to be referred to as $NO_2$ hereunder), and achieves a function of adjusting a ratio between NO and $NO_2$ contained in the exhaust gas to a ratio optimum for reducing $NO_x$. The ammonia purification catalyst is for purifying slip ammonia which passed through the reduction catalyst 4 without contributing to the $NO_x$ reduction. Since ammonia has an irritating odor, it is not preferable to discharge ammonia without purification.

The injection nozzle 5 is disposed on the upstream of the reduction catalyst 4 relative to the flow of the exhaust gas. The injection nozzle 5 is for atomizing the urea water 12 as the reducing agent to add it to the exhaust gas, and is fixed to a pipe wall upper portion of the exhaust passage 3 by a fixing means such as a flange 7 or the like. Further, the injection nozzle 5 is connected to an injection device 9 via a feed pipe 8. The injection device 9 having a configuration of air-assist type takes therein the assist air together with the urea water and injects the urea water via the injection nozzle 5 into the exhaust passage 3. The injection device 9 is connected to the storage tank 11 via a pipe 10. The pipe 10 is connected to the storage tank 11 at a position in the vicinity of a bottom face thereof (in detail, in the vicinity of a bottom face of a sub-tank 112 to be described later).

The urea water 12 stored in the storage tank 11 is supplied under pressure through the pipe 10 by a feed pump 13 to be fed into the injection device 9. The fed urea water is injected into the exhaust passage 3 together with the assist air, to be added to the exhaust gas. The added urea water is hydrolyzed to generate ammonia. Generated ammonia reacts with $NO_x$ in the exhaust gas on the reduction catalyst 4, and reduces to convert $NO_x$ to the water and the harmless gas.

Figure 2:
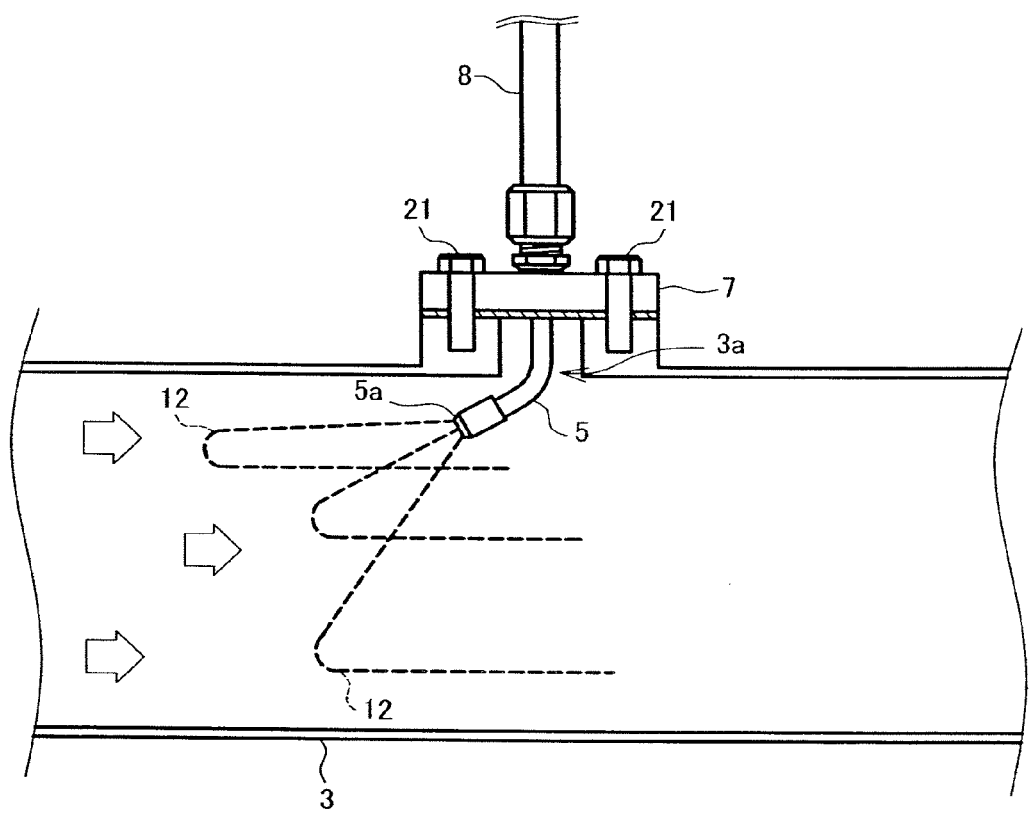
FIG. 2 is a diagrammatic view showing an attachment portion of an injection nozzle according to the above embodiment.

FIG. 2 shows a configuration of an attachment portion of the injection nozzle 5 to the exhaust passage 3 (to be referred simply to as "attachment portion" hereunder).

The injection nozzle 5 is attached to the pipe wall upper portion of the exhaust passage 3 by means of the flange 7, and a nozzle hole 5a is set to open in a direction opposite to the flow of the exhaust gas. In this embodiment, a tip end of the injection nozzle 5 is inclined, so that a central axis of the nozzle hole 5a intersects with a central axis of the exhaust passage 3. On the pipe wall of the exhaust passage 3, there is formed a hole 3a into which the injection nozzle 5 is inserted (to be referred to as "insertion hole" hereunder), and the injection nozzle 5 is arranged in this insertion hole 3a. The flange 7 is fastened to a seating surface formed on the pipe wall of the exhaust passage 3 by means of bolts 21, to cover the insertion hole 3a.

In the above configuration, the urea water 12 is injected by the injection nozzle 5 toward the upstream against the flow of the exhaust gas, to be diffused strongly in the process of being pushed back by the flow of the exhaust gas. Therefore, the urea water 12 can be sufficiently mixed with the exhaust gas before the urea water 12 reaches the reduction catalyst 4, to thereby satisfactorily proceed with the reaction on the reduction catalyst 4.

Further, since the nozzle hole 5a opens in a direction reverse to the flow of the exhaust gas, and the urea water 12 coming adjacent to the nozzle hole 5a and arriving at the periphery thereof is susceptible to an influence of the exhaust heat, the deposition hardly occurs with the urea water 12 (or deposited ammonia is dissolved by the exhaust heat). Therefore, any clogging of the injection nozzle 5 can be prevented.

Figure 3:
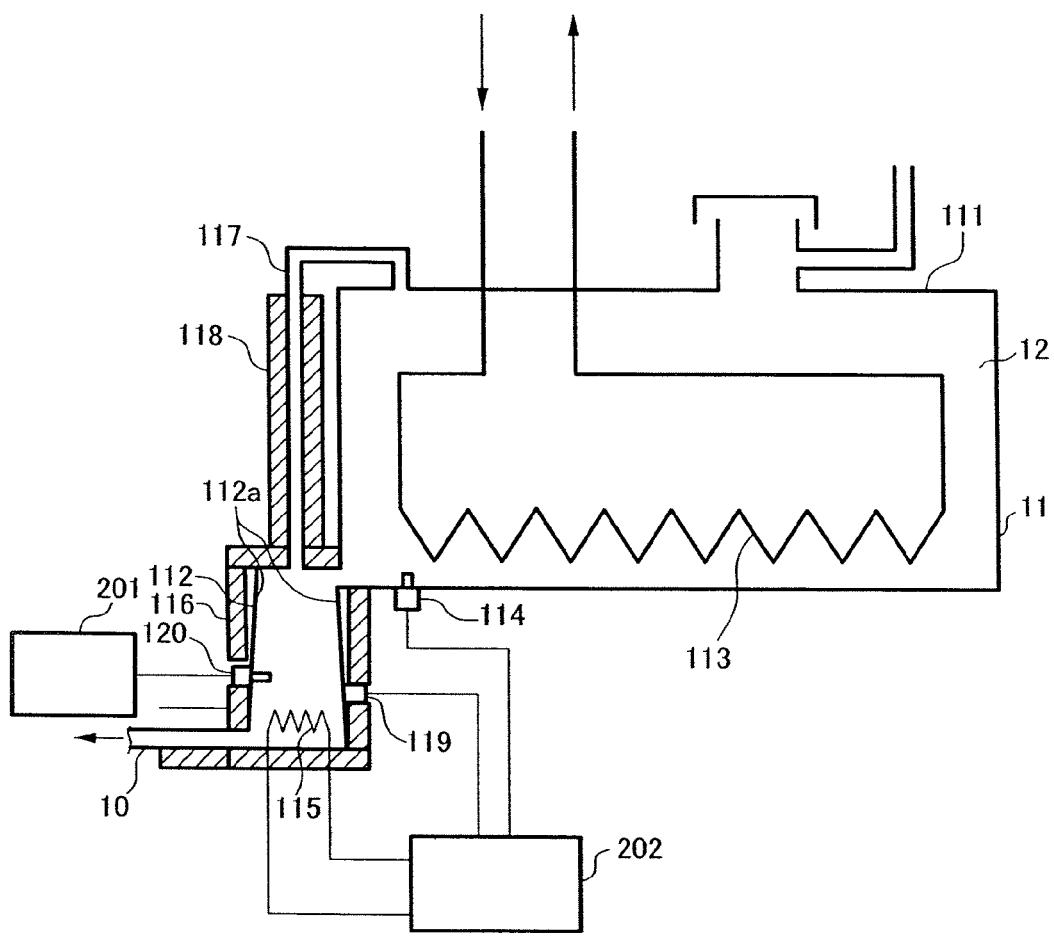
FIG. 3 is a diagrammatic view showing a configuration of a storage tank according to the above embodiment.

FIG. 3 shows a configuration of the storage tank 11.

The storage tank 11 includes a main tank 111 having a large volume and the sub-tank 112 having a small volume. The sub-tank 112 is arranged adjacently to the main tank 111 and also relatively below the main tank 111, so that the urea water 12 in the main tank 111 is flown into the sub-tank 112 due to gravity. In this embodiment, a bottom portion of the main tank 111 and an upper portion of the sub-tank 112 are communicated with each other. To the sub-tank 112, the pipe 10 is connected, so that the urea water 12 in the sub-tank 112 and the urea water 12 which has been flown into the sub-tank 112 from the main tank 111 are fed into the afore-mentioned injection device 9 via the pipe 10.

A heat exchanger 113 is disposed in the vicinity of a bottom face of the main tank 111, so that the urea water 12 in the main tank 111 is heated by this heat exchanger 113. The heat exchanger 113 is for running the cooling water of the engine 1 therethrough to heat the urea water 12 using the cooling water as a medium. Further, in the main tank 111, a temperature sensor 114 for detecting the temperature of the urea water 12 is disposed. A signal from the temperature sensor 114 is inputted to a heater control unit 202 which controls an operation of an electric heater 115 to be described later and the operation stop thereof.

On the other hand, the electric heater 115 is disposed in the vicinity of a bottom face of the sub-tank 112, so that the urea water 12 in the sub-tank 112 is heated by the electric heater 115. The volume of the sub-tank 112 is set so as to be capable of storing the urea water 12 of necessary amount until the urea water 12 in the main tank 111 is defrosted, when an operation of the engine 1 is started under a low temperature environment. An inner side face 112a of the sub-tank 112 is broadened downward to be of a tapered shape, and overhangs the bottom face of the sub-tank 112. The sub-tank 112 is formed of a material of high heat transfer characteristic, so that the urea water 12 receives heat from the entire inner face of the sub-tank 112 together with the heat due to the convection caused by the electric heater 115. The sub-tank 112 is covered by a thermal insulating material 116 such as glass-wool or the like, in order to suppress the heat radiation to the atmosphere and to make the heating by the electric heater 115 efficient. Further, the sub-tank 112 is communicated at the upper portion thereof with an upper portion of the main tank 111 via a vent pipe 117. Similarly to the sub-tank 112, the vent pipe 117 is also formed of a material of high heat transfer characteristic, and at least the site thereof below the maximum liquid level height of the main tank 111 is covered by a thermal insulating material 118 (an upper end of the thermal insulating material 118 being equal to or higher than the maximum liquid level height). In the sub-tank 112, a temperature sensor 119 for detecting the temperature of a wall face of the sub-tank 112 is disposed as a sensor for detecting the temperature of the urea water 12, and also a concentration sensor 120 for detecting the concentration of the urea water 12 is disposed. A signal from the temperature sensor 119 is inputted to the heater control unit 202, whereas a signal from the concentration sensor 120 is inputted to the SCR control unit 201.

Returning to FIG. 1, to the SCR control unit 201, the concentration of the urea water 12 detected by the concentration sensor 120 is input, and also, operating conditions of the engine 1, such as a rotation speed, a load and the like, are inputted by an engine control unit 203. The SCR control unit 201 controls the injection device 9, based on the input concentration and the like, to control an amount of injection from the injection nozzle 5. Further, to the heater control unit 202, the temperature of the urea water 12 detected by each of the temperature sensors 114 and 119 is input. The heater control unit 202 controls the heat exchanger 113 and the electric heater 115 based on the input temperature, to defrost the urea water 12 in the storage tank 11.

Figure 4:
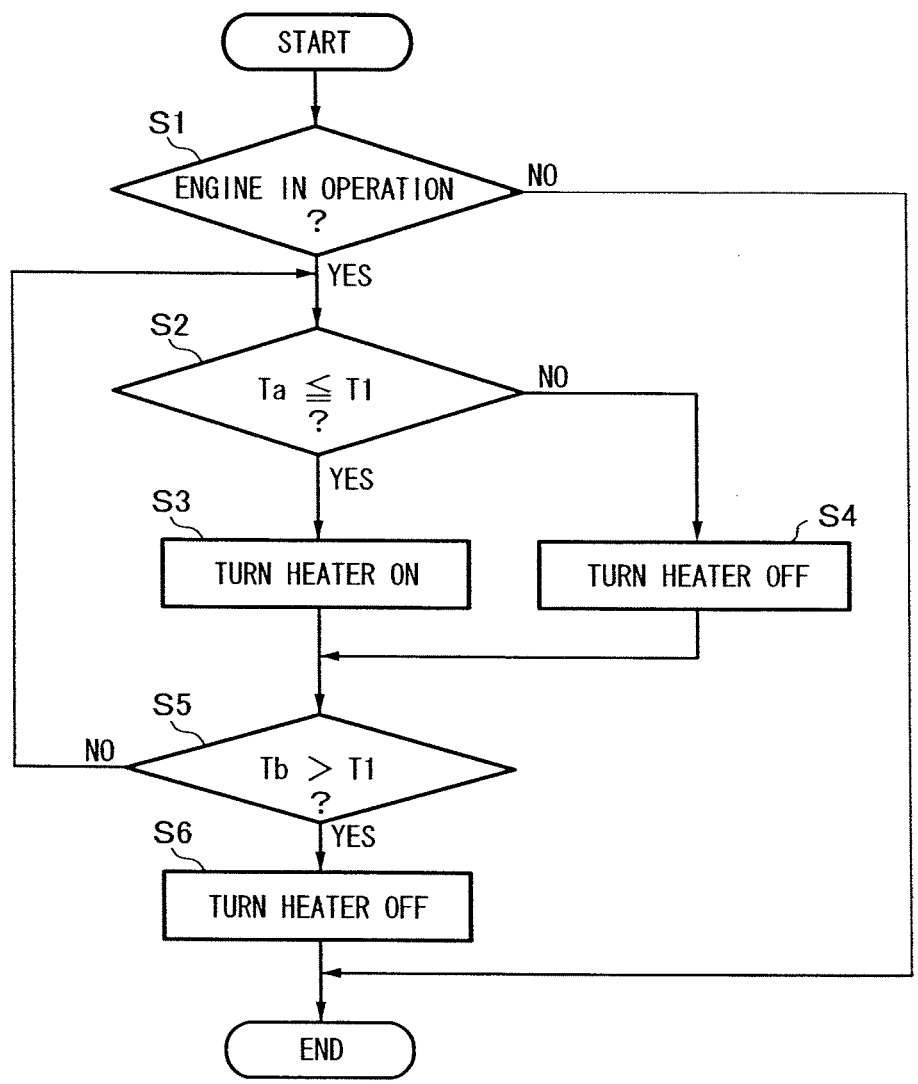
FIG. 4 is a flowchart showing a defrost control routine according to the above embodiment.

FIG. 4 shows a flowchart of a defrost control routine. This routine is repetitively executed at each predetermined time by the heater control unit 202 (which is started when a power source switch such as a key switch or the like is turned on).

In S1, it is detected based on the operating conditions of the engine 1 that the engine 1 is in operation. For example, when the rotation speed of the engine 1 is equal to or higher than a predetermined speed, the engine 1 is in operation. When the engine 1 is in operation, the routine proceeds to S2, while when the engine 1 is not in operation, this routine is returned.

In S2, it is determined whether or not the temperature Ta of the urea water 12 in the sub-tank 112, which is input coming from the temperature sensor 119, is equal to or lower than the predetermined temperature (corresponding to "operating temperature") T1. When the temperature Ta is equal to or lower than the temperature T1, the routine proceeds to S3, while when the temperature Ta is higher than the temperature T1, the routine proceeds to S4. In this embodiment, this predetermined temperature T1 is set at the temperature slightly higher than the freezing temperature of the urea water 12.

In S3, the electric heater 115 is operated, to thereby heat the urea water 12 in the sub-tank 112.

In S4, the operation of the electric heater 115 is stopped.

In S5, it is determined whether or not the temperature Tb of the urea water 12 in the main tank 111, which is input coming from the temperature sensor 114, is higher than the predetermined temperature (corresponding to "operation stop temperature") T1. When the temperature Tb is higher than the temperature T1, the routine proceeds to S6, while when the temperature Tb is equal to or lower than the temperature T1, the processing in S2 to S4 is repetitively executed. Namely, the electric heater 115 is operated and stopped based on the temperature Ta, to thereby maintain the urea water 12 in the sub-tank 112 at or higher than the predetermined temperature T1.

In S6, it is determined that the urea water 12 in the main tank 111 is defrosted, to thereby stop the operation of the electric heater 115.

According to the above control, when the operation of the engine 1 is started under a low temperature environment, the urea water 12 in the main tank 111 is heated by the heat exchanger 113, and also, the urea water 12 in the sub-tank 112 is heated by the electric heater 115. Since the sub-tank 112 has the volume of relatively small, the urea water 12 in the sub-tank 112 can be defrosted promptly by the electric heater 115. Further, the volume of the sub-tank 112 is set so as to be capable of storing the urea water 12 of necessary amount until the supply of the urea water 12 in the main tank 111 becomes possible after the operation of the engine 1 is started. Therefore, it becomes possible to inject the necessary amount of urea water 12 for the $NO_x$ reduction at an early time after the operation of the engine 1 is started, to thereby ensure the exhaust emission purifying performance immediately after the operation of the engine 1 is started.

According to the present embodiment, the following effects can be achieved.

Namely, in this embodiment, the urea water 12 is injected by the injection nozzle 5 toward the upstream relative to the flow of the exhaust gas. Therefore, it is possible to diffuse the injected urea water 12 due to the flow of the exhaust gas, to thereby accelerate the mixing of the urea water 12 with the exhaust gas.

Further, in this embodiment, the storage tank 11 includes the main tank 111 of large volume and the sub-tank 112 of small volume, and the heat exchanger 113 using the cooling water of the engine 1 as the medium is disposed in the main tank 111, and the electric heater 115 is disposed in the sub-tank 112. Therefore, it is possible to defrost promptly the urea water 12 of necessary amount until the urea water 12 in the main tank 111 is defrosted after the operation of the engine 1 is started, to thereby ensure the exhaust emission purifying performance.

Furthermore, in this embodiment, the side face 112a inside of the sub-tank 112 is broadened downward in the tapered shape. Therefore, it is possible to readily remove and drop down a block of ice of the urea water 12, which has been defrosted to be attached to the side face 112a, and also, to lead the removed block of ice toward the periphery of the electric heater 115 without staying it on the side face 112a. Thus, it is possible to efficiently defrost the urea water 12 in the sub-tank 112.

Still further, in this embodiment, the upper portions of the main tank 111 and the sub-tank 112 are communicated with each other via the vent pipe 117. Therefore, even if an inlet port for the urea water 12 from the main tank 111 to the sub-tank 112 is blocked by the urea water 12 before being defrosted, it is possible to flow the air into the sub-tank 112 from the main tank 111 via the vent pipe 117, so that the urea water 12 in the sub-tank 112 may be smoothly suctioned due to vacuum effect. Incidentally, the vent pipe 117 is formed of the material of high heat transfer characteristic, and also, the site thereof below the maximum liquid level height of the main tank 111 is covered by the thermal insulating material 118. Therefore, even if the urea water entered into the vent pipe 117 is frozen, it is possible to defrost promptly this urea water.

Moreover, in this embodiment, the concentration sensor 120 is disposed in the sub-tank 112. Therefore, it is possible to detect the concentration of the urea water 12 at the early time after the operation of the engine 1 is start, to thereby adopt the detected concentration for the injection control of the urea water.

In this embodiment, the time at when the operation of the electric heater 115 is stopped, is set based on the temperature Ta of the urea water 12 in the main tank 111. However, it is also possible to set this time based on an elapsed time after the electric heater 115 is operated. Namely, when the predetermined time T2 has elapsed from the time when the operation of the electric heater 115 is started, it is judged that the urea water 12 in the main tank 111 is defrosted, and the operation of the electric heater 115 is stopped. The predetermined time T2 may be set at a period of time until all amount of the urea water 12 in the sub-tank 112 is defrosted by the electric heater 115.

Further, the vent pipe 117 is not only connected to the main tank 111, but also may be disposed with a reed valve or the like so that an end thereof is opened at a position above the maximum liquid level height of the main tank 111.

Moreover, an electric heater for heating the vent pipe 117 may be disposed. Since the vent pipe 117 can be indirectly heated by the electric heater 115 via the sub-tank 112, and also, can be directly heated by this separate electric heater. Therefore, it is possible to defrost promptly the urea water frozen in the vent pipe 117.

Other embodiments of the present invention will be described in the following.

Figure 5:
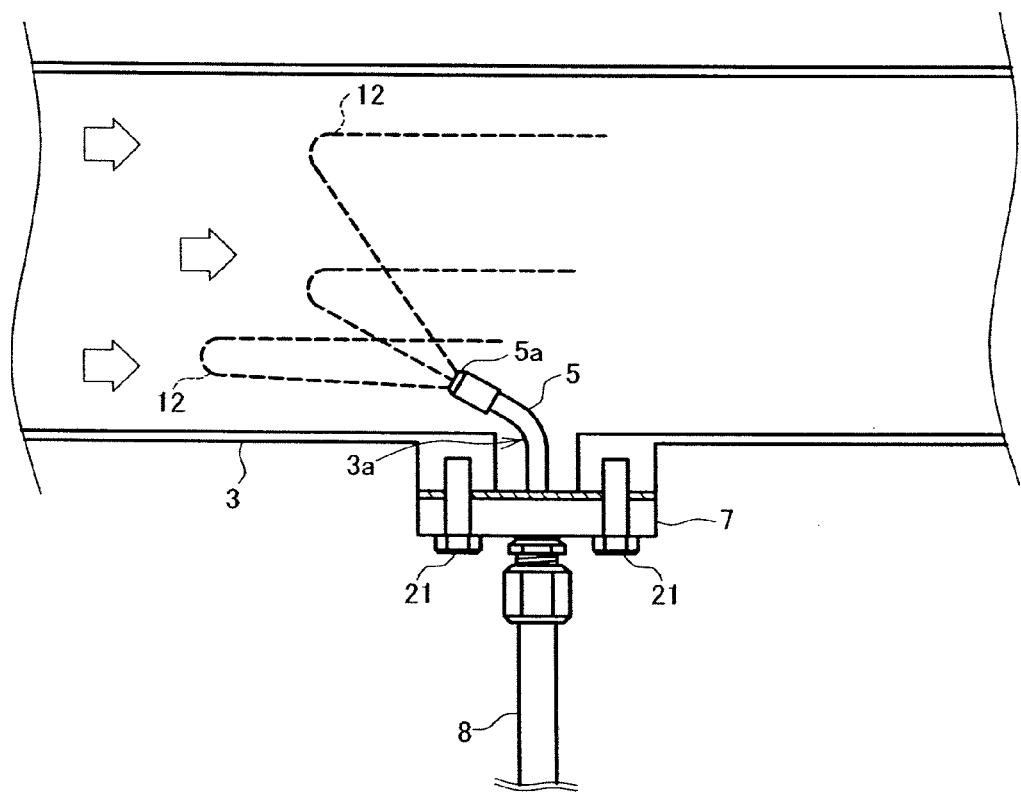
FIG. 5 is a diagrammatic view showing an attachment portion of an injection nozzle according to a second embodiment of the present invention.

FIG. 5 shows a configuration of an attachment portion of the injection nozzle according to a second embodiment of the present invention.

The injection nozzle 5 is attached to a pipe wall bottom portion of the exhaust passage 3 by means of the flange 7, and the nozzle hole 5a is set to open in a direction opposite to the flow of the exhaust gas, similarly to the nozzle hole 5a in the first embodiment. The injection nozzle 5 is arranged in the insertion hole 3a formed on the pipe wall of the exhaust passage 3. The flange 7 is fastened to the seating surface formed on the pipe wall of the exhaust passage by means of the bolts 21 to cover the insertion hole 3a.

According to the present embodiment, the urea water 12 is injected by the injection nozzle 5 toward the upstream against the flow of the exhaust gas, to be diffused strongly in the process of being pushed back by the flow of the exhaust gas, and therefore, the urea water 12 can be mixed with the exhaust gas. Particularly, according to the present embodiment, it is possible to ensure an increased distance of suspension (or an increased duration of suspension) until the injected urea water 12 is attached to a pipe wall bottom face of the exhaust passage 3. Therefore, the urea water 12 can be sufficiently mixed with the exhaust gas before the urea water 12 reaches the reduction catalyst 4 to thereby satisfactorily proceed with the reaction on the reduction catalyst 4. Further, similarly to the above, since the nozzle hole 5a opens In a direction opposite or reverse to the flow of the exhaust gas, any deposition hardly occurs in the urea water 12 in the nozzle hole 5a and at the periphery thereof so that the clogging of the injection nozzle 5 can be prevented.

Figure 6:
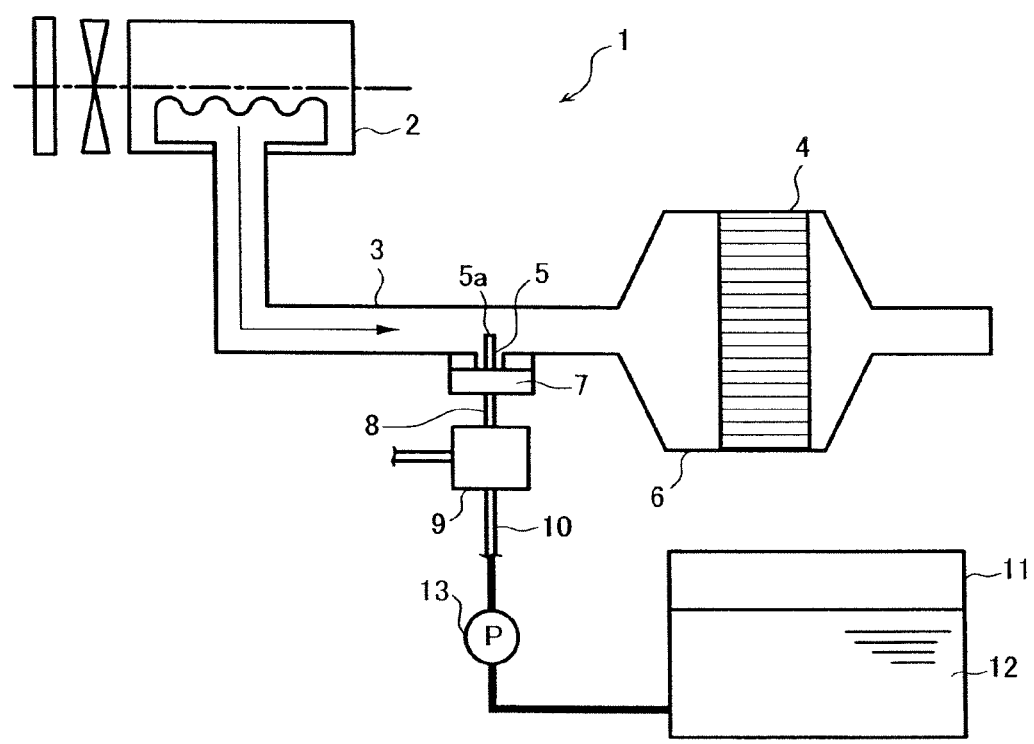
FIG. 6 is a diagrammatic view showing a configuration of an exhaust emission purifying apparatus according to a third embodiment of the present invention.
Figure 7:
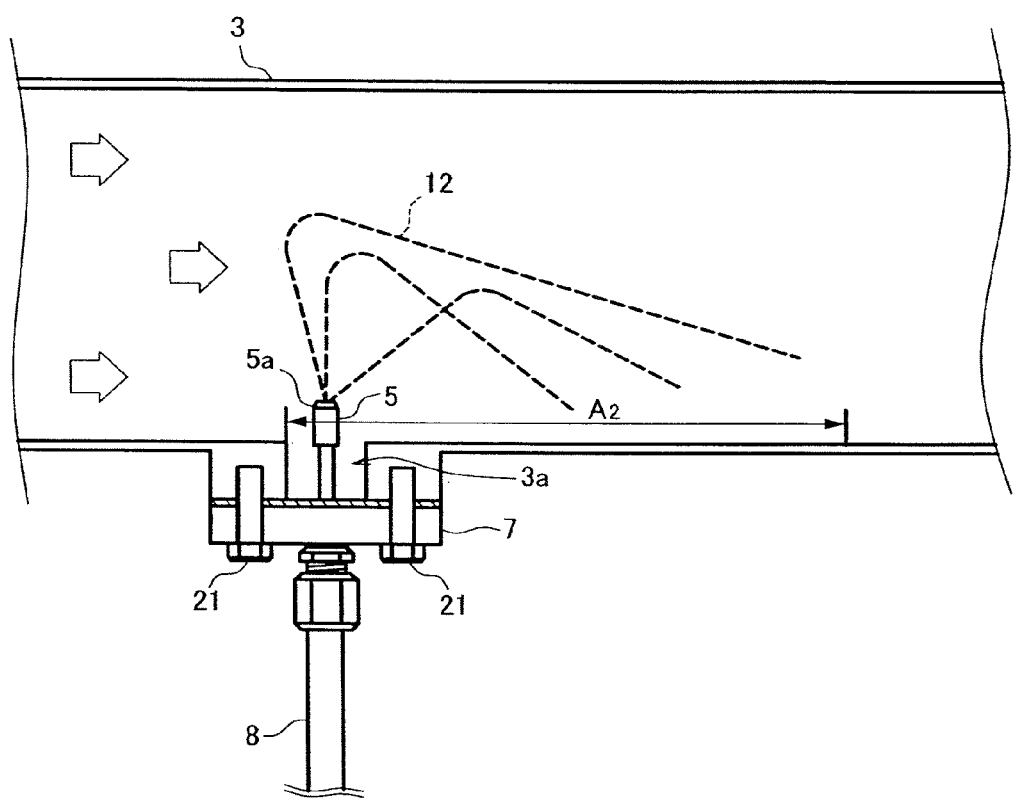
FIG. 7 is a diagrammatic view showing an attachment portion of an injection nozzle according to the above embodiment.

FIG. 6 shows a configuration of the engine 1 including an exhaust emission purifying apparatus according to a third embodiment of the present invention, and FIG. 7 shows a configuration of an attachment portion of the injection nozzle 5 according to the present embodiment.

The injection nozzle 5 is attached to the pipe wall bottom portion of the exhaust passage 3 by means of the flange 7, and the nozzle hole 5a thereof is set to be directed upward in a vertical direction. On the pipe wall of the exhaust passage 3, the insertion hole 3a for inserting therein the injection nozzle 5 is formed, and the injection nozzle 5 is arranged in this insertion hole 3a to be fixed in a state of standing upright from the pipe wall. The flange 7 is fastened to the seating surface formed on the pipe wall of the exhaust passage by means of bolts 21 to cover the insertion hole 3a. The configuration of the storage tank 11 and the configuration of the control system (including the SCR control unit 201 and the heater control unit 202) for the heaters 113 and 115 which are disposed respectively in the injection device 9 and the storage tank 11, are similar to those in the first embodiment. The heater control unit 202 is operated similarly to that in the first embodiment, to promptly defrost the urea water 12 in the sub-tank 112 when the operation of the engine 1 is started under the low temperature environment.

According to this embodiment, the urea water 12 is injected by the injection nozzle 5 transversely to the exhaust gas, so that the urea water 12 can be diffused due to the flow of the exhaust gas. Particularly, according to this embodiment, it is possible to ensure an increased distance of suspension (or an increased duration of suspension) until the injected urea water 12 is attached to the pipe wall bottom face of the exhaust passage 3 by injecting the urea water 12 upward. Therefore, the urea water 12 can be sufficiently mixed with the exhaust gas before the urea water 12 reaches the reduction catalyst 4 to thereby satisfactorily proceed with the reaction on the reduction catalyst 4.

Further, the injection nozzle 5 is disposed in the state of standing upright from the pipe wall, so that the urea water 12 remaining in the nozzle hole 5a can be returned to the feed pipe 8 side without being dropped from the injection nozzle 5 after the injection of the urea water 12 is stopped. Therefore, it is possible to suppress the deposition inform the urea water 12 within the nozzle hole 5a and at the periphery thereof, to thereby prevent the nozzle hole 5a from being clogged.

Furthermore, the injection nozzle 5 is detachably attached to the pipe wall of the exhaust passage 3 by means of the flange 7 and the bolts 21, so that the injection nozzle 5 may be detached from the pipe wall to thereby remove ammonia deposited in the nozzle hole 5a.

Figure 8:
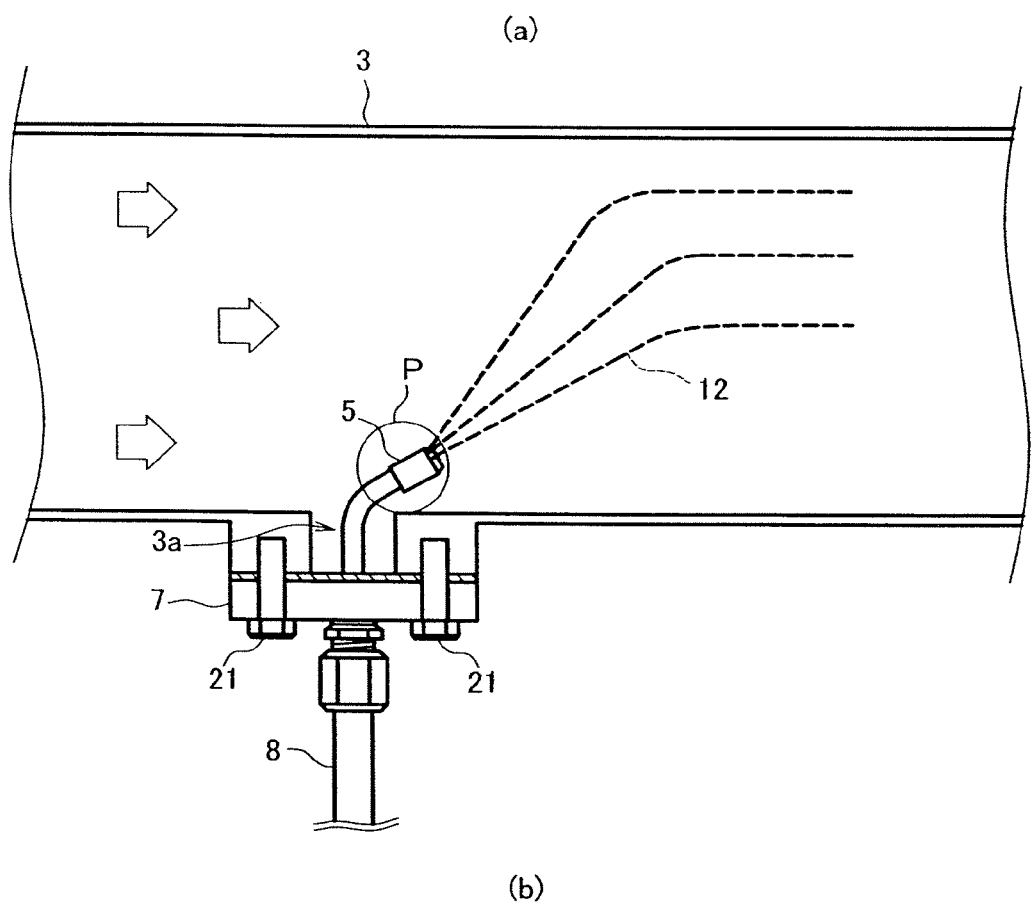
FIG. 8 is a diagrammatic view showing an attachment portion of an injection nozzle according to a fourth embodiment of the present invention.
Figure 8:
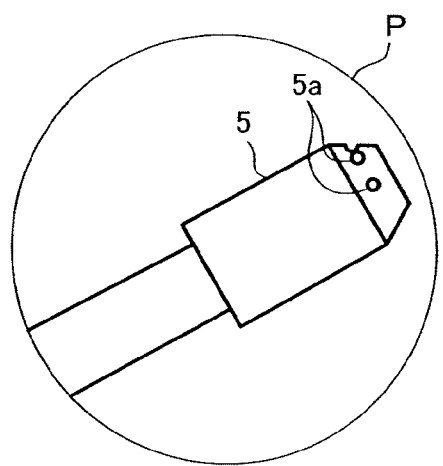

FIG. 8 shows a configuration of an attachment portion of the injection nozzle 5 according to a fourth embodiment of the present invention. The configuration of the entire system other than the injection nozzle 5 is similar to that in the third embodiment.

The injection nozzle 5 is attached to the pipe wall bottom portion of the exhaust passage 3 by means of the flange 7, and the nozzle hole 5a thereof is set to open upward in the vertical direction. Similarly to the above, the injection nozzle 5 is arranged in the insertion hole 3a formed on the pipe wall of the exhaust passage 3. However, in this embodiment, the tip end of the injection nozzle 5 is inclined to a forward direction relative to the flow of the exhaust gas. Further, on the circumference of which reference is the central axis of the injection nozzle 5, at the tip end of the injection nozzle 5, the nozzle hole 5a is formed only on the site above this central axis (refer to FIG. 8b). The flange 7 is fastened to the seating surface formed on the pipe wall of the exhaust passage 3 by means of the bolts 21 to cover the insertion hole 3a.

Even in such a configuration, it is possible to achieve effects similar to those in the third embodiment. Namely, since the urea water 12 is injected upward in the vertical direction, it is possible to ensure the increased distance of suspension (or the increased duration of suspension) of the injected urea water 12, to thereby allow the urea water 12 to be sufficiently mixed with the exhaust gas. Further, the injection nozzle 5 is disposed in the state of standing upright from the pipe wall, so that the urea water 12 remaining in the nozzle hole 5a is returned to the feed pipe 8 side after the injection. Therefore, it is possible to suppress the deposition inform the urea water 12 in the nozzle hole 5a and at the periphery thereof, to thereby prevent the clogging of the nozzle hole 5a, and also, even if the deposition occurs in the urea water 12, it is possible to detach the injection nozzle 5 together with the flange 7 from the pipe wall to thereby remove deposited ammonia.

Figure 9:
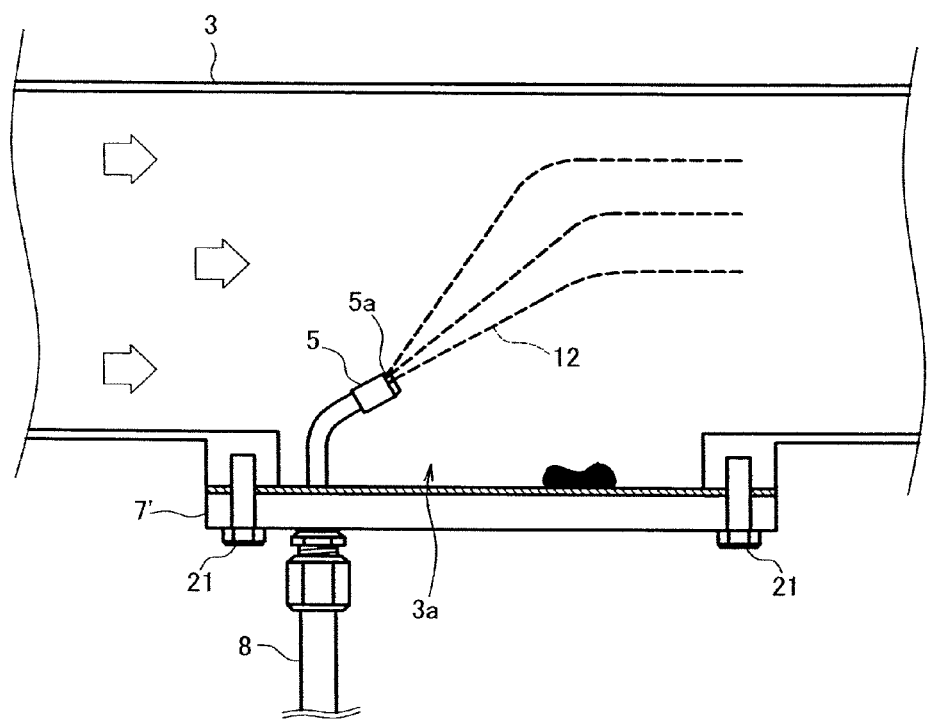
FIG. 9 is a diagrammatic view showing a modified example of the nozzle attachment portion according to the above embodiment.

Incidentally, in the above description, there has been described the case where the insertion hole 3a is formed within a minimum range necessary for arranging the injection nozzle 5, and also, the flange 7 is formed in a compact size as the one adapted to the shape of the insertion hole 3a. FIG. 9 shows a modified example of the attachment portion of the injection nozzle 5. In this example, the insertion hole 3a is disposed so as to extend by the predetermined length in an axial direction of the exhaust passage 3. Here, the length of the insertion hole 3a is set so that the insertion hole 3a overlaps with a range where the urea water 12 injected from the injection nozzle 5 drops to be attached to the wall face. The flange 7 is formed to extend in the axial direction of the exhaust passage 3 as the one adapted to the shape of the insertion hole 3a. In the insertion hole 3a, the injection nozzle 5 is arranged on an end portion on the upstream side relative to the flow of the exhaust gas, and is fixed by means of the flange 7.

According to this embodiment, in addition to the effects described in the fourth embodiment, it is possible to readily remove ammonia deposited in the pipe wall bottom face of the exhaust passage 3, and also it is possible to readily remove ammonia deposited in the inner face of the flange 7.

The injection nozzle 5 may be disposed not only on the upstream of the housing 6 of the reduction catalyst 4, but also on any position in the exhaust passage 3 provided that this position is on the upstream of the reduction catalyst 4. The injection nozzle 5 may be disposed, for example, just after the exhaust manifold or in the housing 6, other than the position under the bottom shown in FIG. 1.

As the reducing agent for NOx, it is possible to adopt the ammonia water or another liquid reducing agent (for example, light oil, gasoline or alcohol), other than the urea water.

The present invention can be applied to an exhaust emission purifying apparatus for a diesel engine other than a direct injection type diesel engine and for a gasoline engine.

In the above description, the present invention has been described based on several preferred embodiments. However, the scope of the present invention is not limited to this description, and is determined based on the disclosure in the scope of claims in accordance with applied articles.

We claim:

1. An exhaust emission purifying apparatus for an internal combustion engine comprising:
   a reduction catalyst for accelerating the reductive purification of nitrogen oxides in the exhaust gas, the reduction catalyst being disposed in an exhaust passage of the internal combustion engine; and
   an injection nozzle for adding a reducing agent for the nitrogen oxides to the exhaust gas, the injection nozzle being disposed on the upstream of the reduction catalyst in the exhaust passage,
   wherein the injection nozzle is arranged in an insertion hole which is formed on a pipe wall bottom portion of the exhaust passage to extend in a flow direction of the exhaust gas, and is fixed in a state of standing upright from the pipe wall bottom portion by means of a flange configured to be detachable and formed to extend in the axial direction of the exhaust passage so as to adopt the shape of the insertion hole, wherein the injection nozzle is arranged on an end portion on the upstream side relative to the flow of the exhaust gas by means of a flange arranged in the insertion hole and the flange being formed to extend in the axial direction of the exhaust passage, and wherein the reducing agent is injected by the injection nozzle upward in a vertical direction.

2. The apparatus according to claim 1, further comprising:
a storage tank for storing the reducing agent, wherein the storage tank includes a first tank and a second tank, the first tank having a relatively large volume, and the second tank having a volume smaller than that of the first tank and being arranged between the first tank and the injection nozzle;
a first heater for heating the reducing agent in the first tank; and
a second heater for heating the reducing agent in the second tank.

3. The apparatus according to claim 2, wherein the first heater is configured to use the internal combustion engine as a heat source thereof, and also, the second heater is an electric heater.

* * * * *